(12) United States Patent
Gopalakrishnan et al.

(10) Patent No.: US 8,055,408 B2
(45) Date of Patent: Nov. 8, 2011

(54) HIGH BANDWIDTH CONTROL OF MAGNETIC RIDE CONTROL SYSTEM

(75) Inventors: Suresh Gopalakrishnan, Farmington Hills, MI (US); Chandra S. Namuduri, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 860 days.

(21) Appl. No.: 12/047,093

(22) Filed: Mar. 12, 2008

(65) Prior Publication Data
US 2009/0234536 A1 Sep. 17, 2009

(51) Int. Cl.
B60G 17/00 (2006.01)
B60G 17/048 (2006.01)
F16F 15/03 (2006.01)
F16F 9/53 (2006.01)

(52) U.S. Cl. .............. 701/37; 188/267; 188/267.1
(58) Field of Classification Search ............ 701/37; 188/267, 267.1, 267.2
See application file for complete search history.

(56) References Cited

U.S. PATENT DOCUMENTS

| | | | | |
|---|---|---|---|---|
| 5,551,540 | A * | 9/1996 | F orster et al. | 188/267 |
| 6,095,486 | A * | 8/2000 | Ivers et al. | 251/129.01 |
| 6,390,252 | B1 * | 5/2002 | Namuduri et al. | 188/267.2 |
| 6,464,049 | B2 * | 10/2002 | Lisenker | 188/267 |
| 6,953,108 | B2 * | 10/2005 | Anderfaas et al. | 188/267.2 |
| 7,275,750 | B2 * | 10/2007 | Suchta et al. | 280/5.511 |
| 7,303,056 | B2 * | 12/2007 | Namuduri | 188/267.2 |
| 7,600,616 | B2 * | 10/2009 | Anderfaas et al. | 188/267 |
| 2004/0154887 | A1 * | 8/2004 | Nehl et al. | 188/266.2 |
| 2005/0253350 | A1 * | 11/2005 | Suchta et al. | 280/124.106 |
| 2006/0124413 | A1 * | 6/2006 | Namuduri | 188/267 |
| 2007/0088475 | A1 * | 4/2007 | Nordgren et al. | 701/37 |
| 2007/0119669 | A1 * | 5/2007 | Anderfaas et al. | 188/267.2 |
| 2008/0105504 | A1 * | 5/2008 | Anderfaas et al. | 188/267.2 |

* cited by examiner

Primary Examiner — Dalena Tran
Assistant Examiner — Jason Holloway
(74) Attorney, Agent, or Firm — John A. Miller; Miller IP Group, PLC

(57) ABSTRACT

A semi-active suspension system that employs magnetically controlled dampers. The semi-active suspension system includes a plurality of sensors that measure vehicle parameters in response to disturbances on the vehicle and provide sensor signals to a central controller. The central controller converts the sensor signals to a flux command signal that is representative of the force on the dampers at each wheel of the vehicle. The flux command signal is sent to a local controller that generates a coil voltage that is applied to a coil within the damper. A flux feedback signal generated by the coil is estimated or measured and is compared to the flux command signal in the local controller to adjust the coil voltage to minimize the difference between the flux command signal and the flux feedback signal to provide a response to the force without a flux delay.

20 Claims, 3 Drawing Sheets

HIGH BANDWIDTH CONTROL OF MAGNETIC RIDE CONTROL SYSTEM

BACKGROUND OF THE INVENTION

1. Field of the Invention

This invention relates generally to a system and method for controlling a semi-active suspension in the vehicle using magnetically actuated dampers and, more particularly, to a system and method for controlling a semi-active suspension in the vehicle using magnetically actuated dampers, where a voltage signal applied to a coil within the damper is determined based on coil flux so as to compensate for the delay in the flux response of the coil.

2. Discussion of the Related Art

As is well understood in the art, vehicles include a suspension system that responds to bumps and other imperfections in the roadway so as to prevent such disturbances from being significantly transferred to the passenger compartment of the vehicle. State of the art suspension systems may be semi-active suspension systems that use magnetically controlled actuators or dampers, sometimes referred to as magnetic ride control (MRC) systems. MRC system dampers provide a continuously variable damping force using an electromagnet and a fluid responsive to a magnetic field or a solenoid pressure control valve. MRC system dampers can employ a magneto-rheological fluid whose friction force is controlled by an electrical signal applied to the fluid. Particularly, the magneto-rheological fluid has a viscosity and/or yield stress that changes in response to an electrical voltage or current. The magneto-rheological fluid includes magnetizable particles suspended in an inert base fluid to provide the viscosity change. Such variable force dampers have also been used to provide vehicle stability control, roll over mitigation, and other vehicle control systems.

SUMMARY OF THE INVENTION

In accordance with the teachings of the present invention, a semi-active suspension system is disclosed that employs magnetically controlled dampers. The semi-active suspension system includes a plurality of sensors that measure vehicle parameters in response to disturbances on the vehicle and provide sensor signals to a central controller. The central controller converts the sensor signals to a flux command signal that is representative of the force on the dampers at each wheel of the vehicle. The flux command signal is sent to a local controller that generates a coil voltage that is applied to a coil within the damper. A flux feedback signal generated by the coil is estimated or measured and is compared to the flux command signal in the local controller to adjust the coil voltage to minimize the difference between the flux command signal and the flux feedback signal to provide a response to the force without a flux delay.

Additional features of the present invention will become apparent from the following description and appended claims taken in conjunction with the accompanying drawings.

DETAILED DESCRIPTION OF THE EMBODIMENTS

The following discussion of the embodiments of the invention directed to a magnetic ride control system employing coil flux control is merely exemplary in nature, and is in no way intended to limit the invention or its applications or uses.

Figure 1:
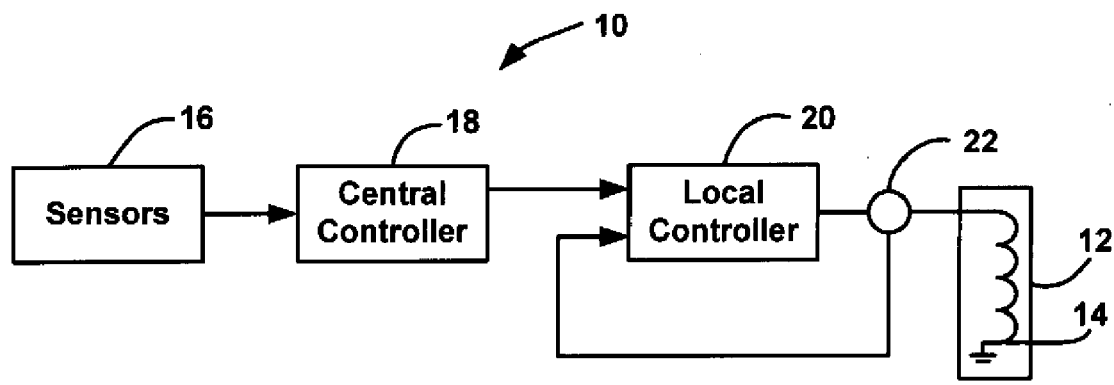
FIG. 1 is a schematic block diagram of a magnetic ride control system of the type known in the art.

FIG. 1 is schematic block diagram of a known MRC system 10 including a magnetic ride damper 12. The damper 12 includes an electrical damper coil 14 that controls the damping force provided by a magneto-rheological fluid within the damper 12. The coil 14 generates a magnetic field across the magneto-rheological fluid flow path. The amount of damping force produced at a given damper velocity depends on the magnetic flux. In order to control the damping force, a coil current is usually varied to indirectly control the flux. The system 10 only shows a single one of the dampers 12 with the understanding that there is a damper 12 at each of the four wheels of the vehicle.

The system 10 also includes a plurality of sensors 16 that measure various vehicle parameters that are used to control the damper 12. The sensors 16 can include, but are not limited to, a steering wheel angle sensor, a lateral accelerometer, a vehicle speed sensor, a position sensor and an acceleration sensor providing acceleration of vehicle wheels relative to a vehicle body. The sensor signals are sent to a central controller 18 that uses the signals to compute the force to be produced by the damper 12 at each corner of the vehicle from a force calculation. The controller 18 calculates a corresponding current command signal $I_{cmd}$ for the damper coil 14 within the damper 12.

The force produced by the damper 12 depends on the magnitude of the coil current and therefore it is enough to employ a single-quadrant chopper for controlling the current in the damper 12. The current command signal $I_{cmd}$ is provided to a local controller 20 at each of the dampers 12. The local controller 20 converts the current command signal $I_{cmd}$ to a coil voltage signal that is used by the coil 14 to provide the damping. A current sensor 22 measures the current of the voltage signal applied to the coil 14, and provides the measured current as a feedback to the local controller 20 so that the local controller 20 can determine if it is providing the proper voltage for the current command signal $I_{cmd}$ for the desired force response. The local controller 20 performs a closed loop current control for the dampers 12, and provides a corresponding pulse with modulation (PWM) voltage to the damper coil 14.

Under ideal conditions, a set of current regulators with a reasonable bandwidth is sufficient to control the damper 12. However, the non-linearities associated with the damper 12 limit the bandwidth of the damper system. The two major non-linearities associated with the known MRC systems are magnetic saturation and eddy currents. The effect of magnetic saturation is predictable and can be compensated for by the controller 20. Eddy currents are induced in the solid core geometry of the damper 12 whenever there is a rate of change in the current of the coil 14. The eddy currents contribute to the air gap flux and the damping force produced. Because the controller 20 uses only feed-forward current control to control the force, it does not use force sensors. Thus, it is not possible to compensate for the influence of eddy currents.

Figure 2:
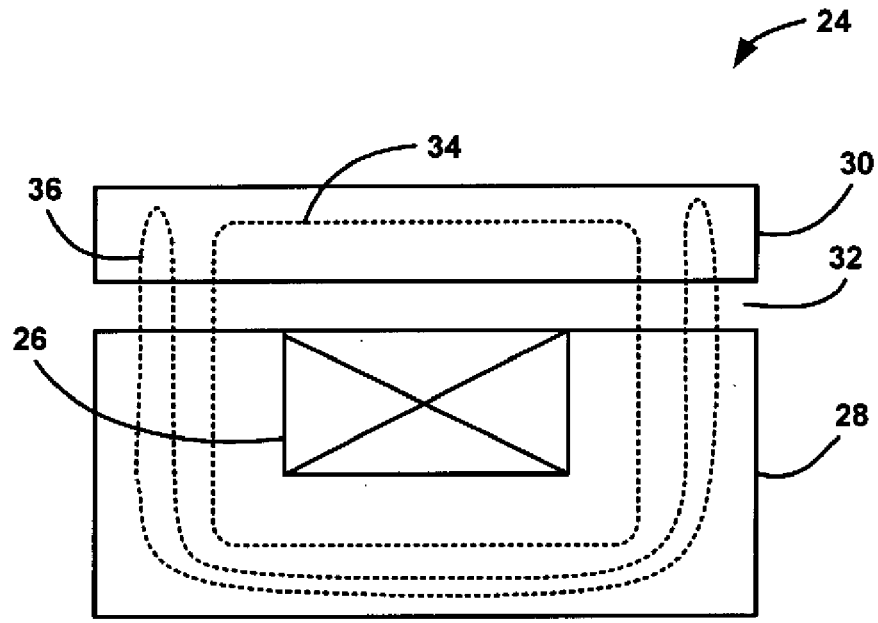
FIG. 2 is a representation of a coil within a solid core of the type used for a damper in a magnetic ride control system.

FIG. 2 is a diagram of a coil assembly 24 showing flux paths that occur during a transient in the damper 12. A coil 26 representing the coil 14 is provided in a solid core 28. An outer ring 30 is positioned adjacent to the solid core 28 and defines an air gap 32 therebetween. Flux lines 34 show the main flux due to the coil current. Flux lines 36 show the eddy currents generated by the solid core 28 and the outer ring 30. An air gap flux is produced in the air gap 32 by both the coil current and the eddy currents, and the damping force of the damper 12 depends only on the net air gap flux.

Figure 3:
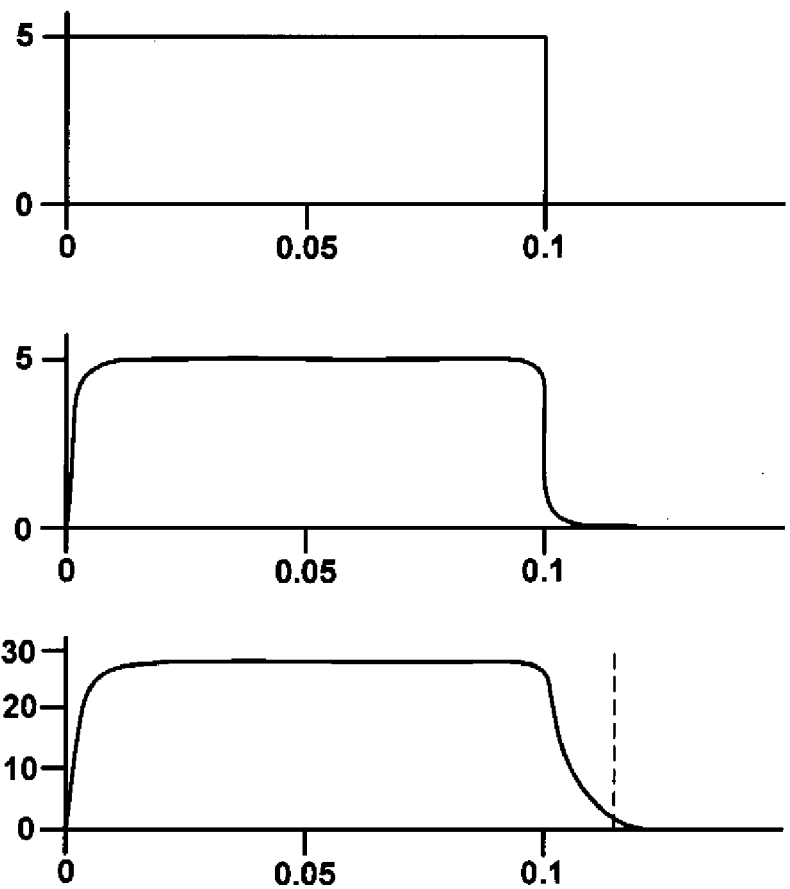
FIG. 3 shows a series of graphs with time on the horizontal axis and amplitude on the vertical axis showing a current command, actual current and a flux response from a coil in an MRC damper of the type known in the art.

FIG. 3 shows a series of three graphs with time on the horizontal axis and amplitude on the vertical axis showing simulation results for a step change in coil current and the resulting air gap flux. The top graph is the current command signal $I_{cmd}$ from the central controller 18, the middle graph is the actual current applied to the coil 14 from the local controller 20, and the bottom graph is the flux response of the coil 14 in response to the current signal applied to it. It can be seen that there is a considerable lag between the coil current and the actual gap flux response shown by the dotted line. The delay in the flux response is caused by the eddy currents, which take a much longer time to decay to zero. Thus, controlling the current applied to the coil 14 to control the force of the damper 12 produces the delay in flux response. From FIG. 3, it is shown that the coil current typically takes around 5 ms to rise and fall to the steady-state values, whereas the flux takes about 30-40 ms to reach steady-state levels. The delay between the application of the coil current to the coil 14 and the actual response of the damper 12 may result in harshness in the vehicle ride, especially during significant transients.

Because the force produced depends only on the air gap flux, it is not possible for the controller 20 to compensate for the gap flux simply by controlling the coil current. The delay in the flux response causes sudden jumps in the force level and the damper velocity changes sign. Also, the delay in the flux response causes higher amounts of hysteresis between the damper velocity and the force produced, which limits the bandwidth of the damper system.

Figure 4:
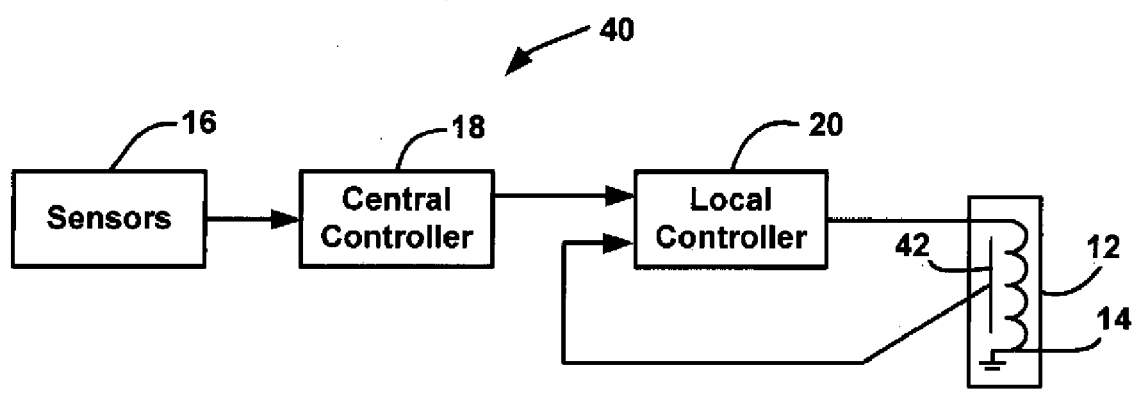
FIG. 4 is a schematic block diagram of a magnetic ride control system, according to an embodiment of the present invention.

The present invention proposes a system and method for improving the frequency response of the MRC system 10. Particularly, instead of controlling the coil current to the coil 14, the air gap flux is controlled which is ultimately responsible for producing the damping force. FIG. 4 is a schematic block diagram of an MRC system 40, similar to the MRC system 10, where like elements are identified by the same reference numeral, according to an embodiment of the present invention. In the system 40, the central controller 18 converts the current command signal to a flux command signal that has a one-to-one mapping for the damper 12. Further, instead of the feedback to the local controller 20 being the measured current of the voltage applied to the coil 14, the feedback is the air gap flux produced by the coil 14. Since the damping force depends only on the net air gap flux, controlling the flux directly is expected to result in better dynamics and improved frequency response.

The air gap flux produced by the coil 14 can be measured by a passive search coil 42 wound around the coil 14 within the damper 12. The magnetic flux generated by the coil 14 produces a current in the search coil 42 that can be determined by the controller 20 to produce the desired coil voltage. The measured flux is compared to the flux command signal in the local controller 20 to generate an error signal, and the coil voltage is then changed to minimize the error signal. However, providing the search coil 42 within the damper 12 offers a number of drawbacks because space is limited in the damper 12 and additional leads and hardware are required to get the current signal out of the damper 12.

Figure 5:
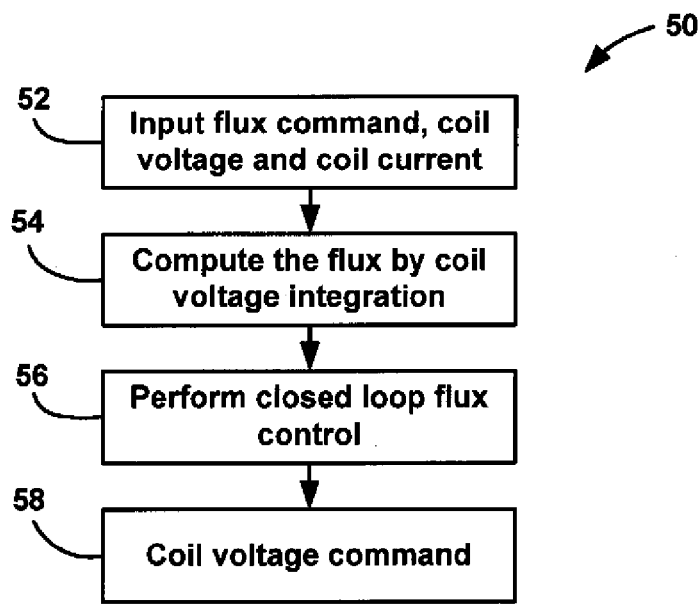
FIG. 5 is a flow chart diagram showing a process for determining the magnetic flux in the damper of the magnetic ride control system shown in FIG. 4 to provide flux control, according to an embodiment of the present invention.

In an alternate embodiment, the air gap flux is estimated using a virtual sensor. FIG. 5 is a flow chart diagram 50 showing a closed-loop operation in the local controller 20 for calculating the voltage command signal to the coil 14 using a virtual sensor that estimates a flux feedback signal $\lambda$. At box 52, the local controller 20 receives the flux command signal from the central controller 18, and determines a coil voltage V and a coil current i for the coil 14 based on the flux command signal. The controller 20 then calculates the flux feedback signal $\lambda$ generated by the coil 14 at box 54 by integrating the inductive voltage v of the coil 14 as:

$$\lambda = \int v_L dt$$

Where, $$v_L = V - i*(R_{coil} + R_{harness} + R_{switch})$$

And where R is resistance. The calculated flux feedback signal $\lambda$ is then compared to the flux command signal in the controller 20 at box 56 to determine the error between the flux command signal and the flux feedback signal $\lambda$ using, for example, a proportional-integral-derivative (PID) control process. A new coil voltage command is then calculated by the controller 20 at box 58 to change the flux feedback signal $\lambda$ that is produced by the coil 14 to minimize the error.

Figure 6:
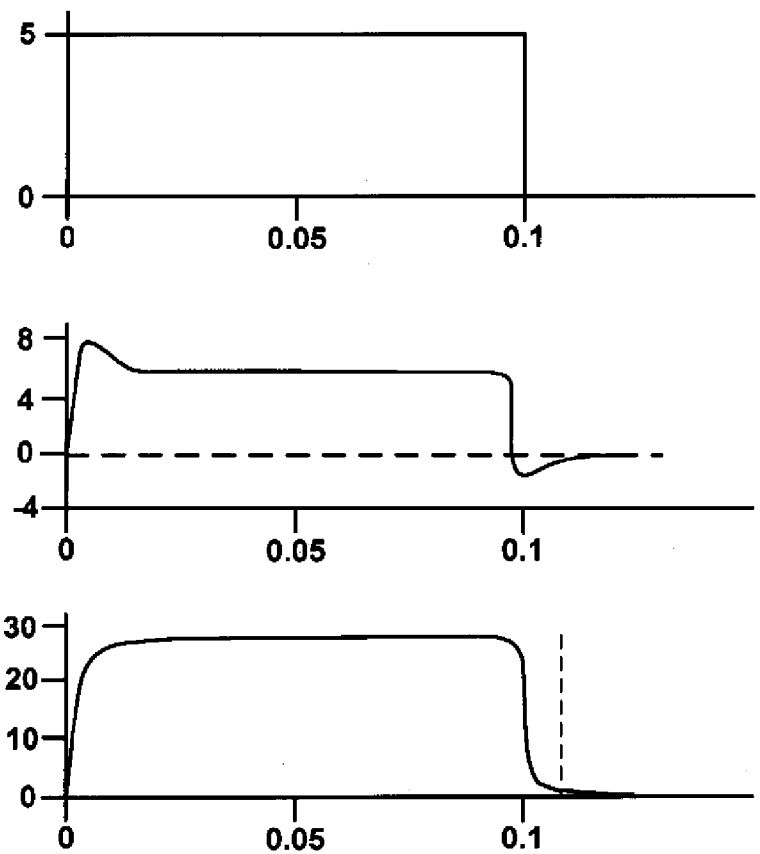
FIG. 6 shows a series of graphs with time on the horizontal axis and amplitude on the vertical axis similar to the graphs shown in FIG. 3 showing an improvement in flux response in the MRC damper of the invention.

FIG. 6 shows a series of three graphs similar to the graphs shown in FIG. 3 that provide results from the method of the invention of using flux feedback, as discussed above. In the technique of the invention, the central controller 18 first determines the current command, then converts the current command into a flux command from which closed loop flux control is provided. As with FIG. 3, the middle graph shows the actual current applied to the damper 12. In order to get the desired flux response shown in the bottom graph of FIG. 6 where there is a smaller delay in the force provided by the damper 12, the actual current provided to the damper 12 needs to exceed the current command when the actual current in ramping up, and needs to go negative when the actual current is ramping down. Thus, the coil current is bidirectional and hence the controller 20 can employ an H-bridge controller for controlling the current. This actual current calculated based on the flux response gives the smaller delay shown by the dotted line in the bottom graph of FIG. 6 over that shown in the bottom graph of FIG. 3.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A magnetic ride control system for a vehicle, said system comprising:

at least one damper providing a variable damping force, said at least one damper including a damper coil;

a plurality of sensors for detecting various vehicle parameters;

a central controller responsive to sensor signals from the plurality of sensors and generating a flux command signal; and a local controller for controlling the at least one damper, said local controller being responsive to the flux command signal and a flux feedback signal produced by flux in a gap in the damper, said local controller generating a coil voltage in response to the flux command signal that is applied to the damper coil to control the damping force of the damper.

2. The system according to claim 1 wherein the plurality of sensors include a steering wheel angle sensor, a vehicle speed sensor, a position sensor and an acceleration sensor providing acceleration of vehicle wheels relative to a vehicle body.

3. The system according 1 wherein the at least one damper includes a magneto-rheological fluid disposed therein, said damper coil providing a magnetic flux across a flow path of the fluid.

4. The system according to claim 1 wherein the damper coil is mounted in a solid core.

5. The system according to claim 1 wherein the at least one damper includes a search coil that measures the flux in the air gap and provides the flux feedback signal as a measured signal.

6. The system according to claim 1 wherein the local controller estimates the flux feedback signal based on the coil voltage, a coil current and coil resistance.

7. The system according to claim 6 wherein the local controller calculates the flux feedback signal by the equation:

$$\lambda = \int v_L dt$$

where $\lambda$ is the flux feedback signal and $v_L$ is the inductive voltage of the coil.

8. The system according to claim 6 wherein the local controller compares the flux command signal to the flux feedback signal, generates an error signal between the flux command signal and the flux feedback signal and changes the coil voltage to change the flux feedback signal and minimize the error signal.

9. The system according to claim 1 wherein the coil voltage applied to the damper coil generates a coil current that exceeds a current command signal that is proportional to the flux command signal at a beginning of when the coil voltage is applied to the damper coil and provides a negative coil current at an end of when the coil voltage is provided to the damper coil.

10. The system according to claim 1 wherein the at least one damper is four dampers where a damper is provided at each wheel of the vehicle.

11. A magnetic ride control system for a vehicle, said system comprising:

at least one damper providing a variable damping force, said at least one damper including a damper coil;

a plurality of sensors for detecting various vehicle parameters;

a central controller responsive to sensor signals from the plurality of sensors and generating a flux command signal; and a local controller for controlling the at least one damper, said local controller being responsive to the flux command signal and a flux feedback signal generated by flux in an air gap of the damper, said local controller producing a coil voltage that is applied to the damper coil and controls the damping of the damper, said local controller estimating the flux feedback signal based on the coil voltage, coil current and coil resistance, wherein the coil voltage applied to the damper coil generates the coil current that exceeds a current command signal that is proportional to the flux command signal at a beginning of when the coil voltage is applied to the damper coil and provides a negative coil current at an end of when the coil voltage is provided to the damper coil.

12. The system according to claim 11 wherein the plurality of sensors include a steering wheel angle sensor, a vehicle speed sensor, a position sensor and an acceleration sensor providing acceleration of vehicle wheels relative to a vehicle body.

13. The system according 11 wherein the at least one damper includes a magneto-rheological fluid disposed therein, said damper coil providing a magnetic flux across a flow path of the fluid.

14. The system according to claim 11 wherein the damper coil is mounted in a solid core.

15. The system according to claim 11 wherein the local controller calculates the flux feedback signal by the equation:

$$\lambda = \int v_L dt$$

where $\lambda$ is the flux feedback signal and $v_L$ is the inductive voltage of the coil.

16. The system according to claim 11 wherein the local controller compares the flux command signal to the flux feedback signal, generates an error signal between the flux command signal and the flux feedback signal and changes the coil voltage to change the flux feedback signal and minimize the error signal.

17. A magnetic ride control system for a vehicle, said system comprising:

at least one damper providing a variable damping force, said at least one damper including a damper coil mounted in a solid core positioned adjacent to a core ring and providing an air gap therebetween, said at least one damper further including a magneto-rheological fluid disposed therein, said damper coil providing a magnetic flux across a flow path of the fluid to provide the damping;

a plurality of sensors for detecting various vehicle parameters;

a central controller responsive to sensor signals from the plurality of sensors and generating a flux command signal; and a local controller for controlling the at least one damper, said local controller being responsive to the flux command signal and a flux feedback signal produced by flux in the air gap in the damper, said local controller generating a coil voltage in response to the flux command signal that is applied to the damper coil to control the damping force of the damper.

18. The system according to claim 17 wherein the local controller estimates the flux feedback signal based on the coil voltage, a coil current and coil resistance.

19. The system according to claim 18 wherein the local controller compares the flux command signal to the flux feedback signal, generates an error signal between the flux command signal and the flux feedback signal and changes the coil voltage to change the flux feedback signal and minimize the error signal.

20. The system according to claim 17 wherein the coil voltage applied to the damper coil generates a coil current that exceeds a current command signal that is proportional to the flux command signal at a beginning of when the coil voltage is applied to the damper coil and provides a negative coil current at an end of when the coil voltage is provided to the damper coil.

* * * * *